Sept. 19, 1961 B. MORRISON 3,000,419
AUTOMOBILE LUGGAGE RACK COVER
Filed Oct. 12, 1959 2 Sheets-Sheet 1

Billy Morrison
INVENTOR.

BY *Clarence A. O'Brien
and Harvey B. Jacobson*
Attorneys

Sept. 19, 1961 B. MORRISON 3,000,419
AUTOMOBILE LUGGAGE RACK COVER
Filed Oct. 12, 1959 2 Sheets-Sheet 2
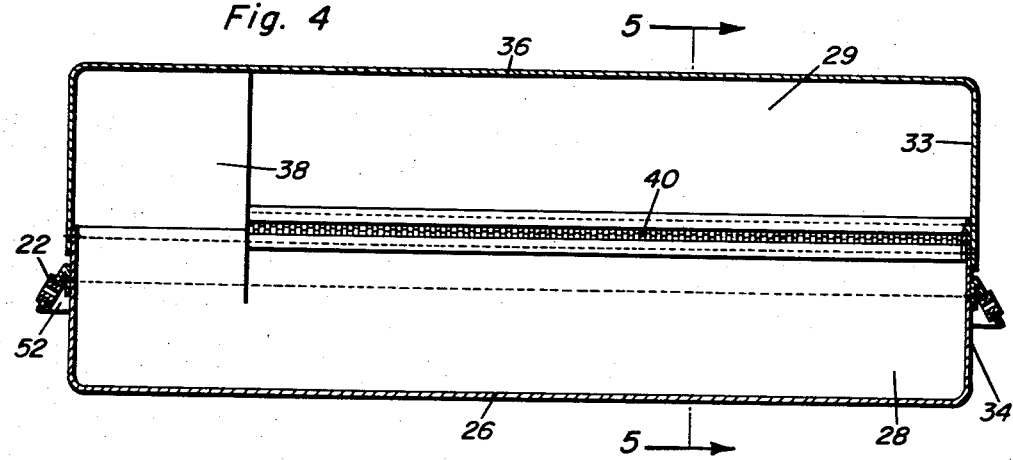
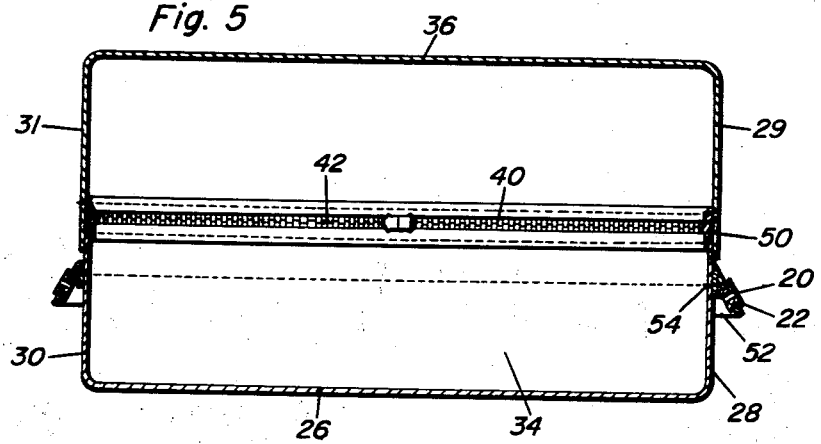
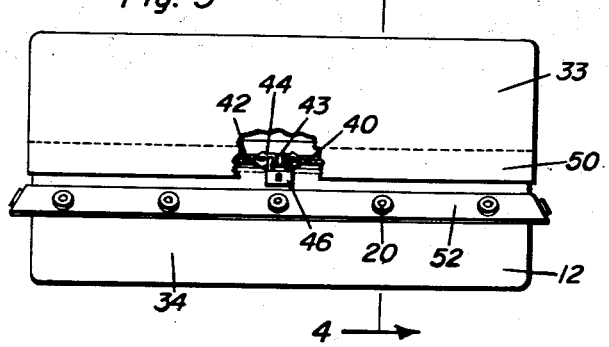
Billy Morrison
INVENTOR.

2,869,903

United States Patent Office 3,000,419
Patented Sept. 19, 1961

3,000,419
AUTOMOBILE LUGGAGE RACK COVER
Billy Morrison, 206 S. Pecos, Midland, Tex.
Filed Oct. 12, 1959, Ser. No. 845,740
4 Claims. (Cl. 150—52)

This invention relates to a novel cover to convert an open luggage rack to a closed container for the protection of articles transported by the luggage rack.

An object of the invention is to provide a unique cover proportioned and dimensioned to fit a motor vehicle luggage rack and which is either permanently or separably connected therewith. The cover forms a container which is easily opened to any selected degree within predetermined limits, and which serves, among many other functions, the purpose of maintaining the transported articles protected and enables the carrying of small articles which would otherwise be impossible to retain in or on an ordinary luggage rack.

Briefly, the luggage rack cover is made of a receptacle having a bottom and side walls, together with a top wall. The top wall, at least, is made of flexible material and is joined preferably by slide fasteners to side walls so that it may be hingedly opened with the material of the cover functioning as the hinge.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 3 is an end view of the cover, parts being broken away to expose a preferred locking arrangement for the slide fasteners.

FIGURE 4 is a sectional view taken on the line 4—4 of FIGURE 3.

FIGURE 5 is a transverse sectional view taken on the line 5—5 of FIGURE 4.

Figure 1:
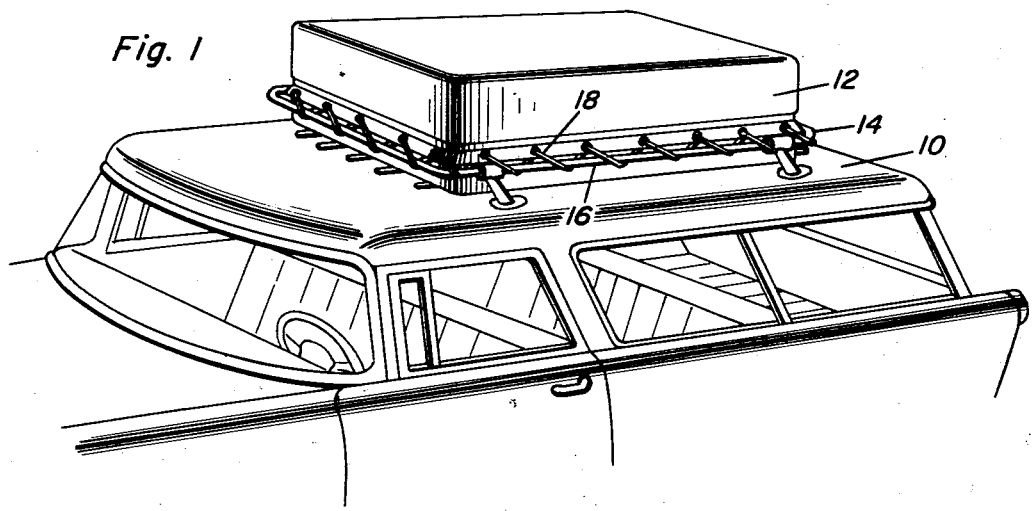
FIGURE 1 is a perspective view of a part of a motor vehicle having a conventional luggage rack equipped with a rack cover in accordance with the invention.

In the accompanying drawings, motor vehicle top 10 is shown equipped with a conventional luggage rack 14. The luggage rack cover 12 not only functions as a cover but also as a receptacle within which to place any article within the judgment of the user. Rack 14, being conventional, includes a rectangular frame 16 mounted horizontally on the vehicle top 10 in vertically spaced relation thereto and in which the cover 12 is secured. Rope 18 is used for this purpose, the rope being wrapped around the frame 16 and passed through the openings 20 in grommets 22 on the side flap 24 of the cover.

Figure 2:
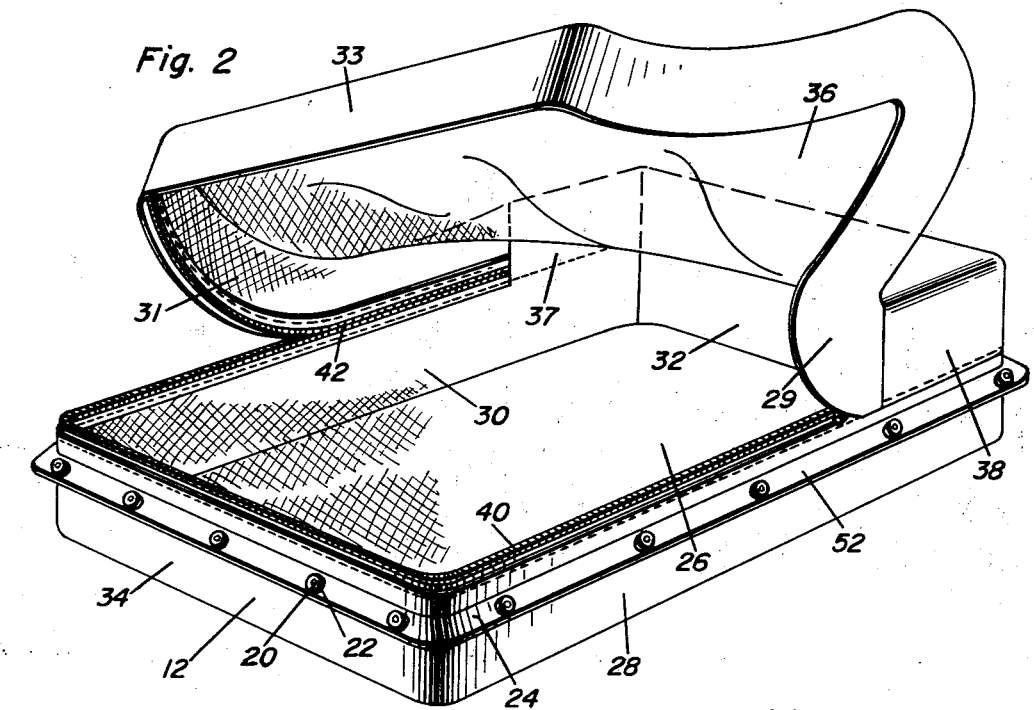
FIGURE 2 is a perspective view showing the cover with the closure in a partially opened position.

Structurally, the cover has a bottom wall 26, preferably rectangular in shape, together with four side walls 28, 30, 32 and 34, respectively. The side walls are joined at their lower edges along the periphery of bottom wall 26, for instance, by stitching or being made integral therewith or joined in any other way. Top wall 36 constitutes a closure for the cover 12, and it has portions 29 and 31 of side walls 28 and 30 joined to two edges thereof, together with portion 33 of side wall 34 joined thereto. The rear parts 37 and 38 of portions 29 and 31 are made integral with the rear parts of walls 28 and 30 (FIGURE 2) while portions 29 and 30 toward the front thereof and also portion 33 in its entirety are separably connected to the parts of the walls 28, 30 and 34 which are fixed to bottom wall 26. Fastening means, for instance, two slide fasteners 40 and 42, are used to join the separable portions 29, 33 and 31 to the described parts of walls 28, 30, and 34. It is preferred that two slide fasteners be used and that they be capable of independent operation, opening from the front or rear. Pull tabs 43 and 44 (FIGURE 3) of the two slide fasteners may be locked together by means of lock 46, thereby serving as a safety feature as well as an anti-theft device. The shallow strip 50 defined by the lower edge area of portions 29, 31 and 33 constitutes a flap to overlie the slide fasteners, thereby excluding rain, snow, etc.

There is a strip 52 stitched, as at 54, to the outer part of the four side walls of the cover, and the aforementioned grommets 22 are in strip 52. The strip and grommets constitute a very handy and easily used means for securing the cover to the rack of the motor vehicle.

The material of construction may vary. However, the closure must be made of flexible material, for instance, cloth impregnated to make it water repellent or plastic of a proper selection. The bottom and side walls of the cover may be made of a similar material. Reinforcing such as used in ordinary luggage construction techniques may be used where found desirable or necessary.

In use, the rack cover is installed as described. It is capable of being opened from one end and/or either side because the two slide fasteners are of the type which function in this way, both being conventional. When the slide fasteners are opened to any selected amount, the interior of the cover is easily reached for removal of articles or for placing articles in the cover. When the cover is closed, it increases the volumetric capacity of the rack and is particularly useful in the retention of small or irregularly shaped articles which are not easily tied on the rack. All articles carried by the rack are maintained in a protected position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a vehicle luggage rack of the type including a generally rectangular frame mounted horizontally on the vehicle top in vertically spaced relation tthereto, a cover comprising a flat, flexible, generally rectangular container insertable in the frame and adapted to rest on the vehicle top, said container having an access opening therein, an endless flap on the container extending horizontally therearound below the opening therein and adapted to overlie the frame, spaced grommets in the flap, and a rope threaded through said grommets and adapted to be looped under and around the frame for lashing the container therein.

2. A luggage rack cover comprising a container having a bottom wall, side walls and a closure, said closure constituting the top wall of the rack and being flexible at least in part so that a portion of the closure functions as a hinge when opening the cover, and means connected with said side walls for securing the side walls to the rack, said securing means including a strip attached to said side walls and having openings therein through which a rope is adapted to pass in securing the side walls to the rack.

3. A cover for the luggage rack of a motor vehicle, said cover comprising a bottom wall, side walls secured to said bottom wall and having upper and lower portions, a top wall, at least one side wall being continuous and unbroken and joining one edge of said top wall with said bottom wall, three of said side walls having upper and lower portions secured to said top wall and said bottom wall respectively, fastening means connected to said upper and lower portions of said side walls, thereby separably connecting a part of said top wall with said side walls, said upper portions of said side walls including free longitudinal marginal portions overlying said fastening means, said top wall being made of flexible material so as to constitute a hinge at an indefinite location thereof, and thereby facilitate opening the top wall with reference to the bottom wall, and means including grommets carried by said side walls for securing said side walls to the automobile luggage rack.

4. The combination of claim 3 wherein the cover is dimensioned to fit within the area defined by the luggage rack with a portion of the side walls fitting down within the lugage rack and thereby assisting in holding the cover captive within the luggage rack.

References Cited in the file of this patent

UNITED STATES PATENTS 1,454,220    Hall ------------------ May 8, 1923

FOREIGN PATENTS 724,687    Great Britain ---------- Feb. 23, 1955
1,147,612    France ---------------- June 11, 1957